US007058903B1

(12) United States Patent
Jonach et al.

(10) Patent No.: US 7,058,903 B1
(45) Date of Patent: Jun. 6, 2006

(54) IMAGE DATABASE JOG/SHUTTLE SEARCH

(75) Inventors: Kurt Jonach, San Jose, CA (US); Robert Jay Sato, Fort Lee, NJ (US); John Tree, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 275 days.

(21) Appl. No.: 09/696,402

(22) Filed: Oct. 24, 2000

Related U.S. Application Data

(60) Provisional application No. 60/181,843, filed on Feb. 11, 2000.

(51) Int. Cl.
*G06F 13/00* (2006.01)

(52) U.S. Cl. ...................... 715/834; 715/838

(58) Field of Classification Search .............. 345/762, 345/763, 764, 751, 810, 216, 123, 115, 156, 345/775, 841; 715/810, 828, 829, 834, 840, 715/835, 838
See application file for complete search history.

(56) References Cited

U.S. PATENT DOCUMENTS

| 3,785,721 | A | 1/1974 | Harsch |
| 5,091,967 | A | 2/1992 | Ohsawa |
| 5,267,154 | A | 11/1993 | Takeuchi et al. |
| 5,303,148 | A | 4/1994 | Mattson et al. |
| 5,327,521 | A | 7/1994 | Savic et al. |
| 5,428,723 | A | 6/1995 | Ainscow et al. |
| 5,561,745 | A | 10/1996 | Jackson et al. |
| 5,600,765 | A | 2/1997 | Ando et al. |
| 5,615,123 | A | 3/1997 | Davidson et al. |
| 5,634,012 | A | 5/1997 | Stefik et al. |
| 5,682,525 | A | 10/1997 | Bouve et al. |
| 5,710,887 | A | 1/1998 | Chelliah et al. |
| 5,721,827 | A | 2/1998 | Logan et al. |
| 5,727,201 | A | 3/1998 | Burke |
| 5,732,216 | A | 3/1998 | Logan et al. |
| 5,734,823 | A | 3/1998 | Saigh et al. |
| 5,737,538 | A | 4/1998 | Wilhite |
| 5,748,898 | A | 5/1998 | Ueda |
| 5,751,838 | A | 5/1998 | Cox et al. |
| 5,760,916 | A | 6/1998 | Dellert et al. |
| 5,768,142 | A | 6/1998 | Jacobs |
| 5,768,528 | A | 6/1998 | Stumm |
| 5,771,354 | A | 6/1998 | Crawford |
| 5,781,665 | A | 7/1998 | Cullen et al. |
| 5,794,006 | A | 8/1998 | Sanderman |
| 5,802,292 | A | 9/1998 | Mogul |
| 5,805,745 | A | 9/1998 | Graf |

(Continued)

OTHER PUBLICATIONS

Person, P. MP3, A De Facto Standard For Music On The Internet, Protecting Your Intellectual Property, Security, Encryption And Anti-Copy Technologies (Ref No. 1999/083, IEE Seminar on Mar. 26, 2999, pp. 1-5.

(Continued)

*Primary Examiner*—Cao (Kevin) Nguyen
(74) *Attorney, Agent, or Firm*—Blakely, Sokoloff, Taylor & Zafman LLP

(57) ABSTRACT

A computerized system, comprising: manipulating a dial; interacting with software, wherein the dial is interactive with the software for sequentially viewing a plurality of files.

Additionally, manipulation of the dial by rotation sequentially moves the plurality of files and further manipulation of the dial further increases the speed of file sequencing.

44 Claims, 4 Drawing Sheets

U.S. PATENT DOCUMENTS

| | | | |
|---|---|---|---|
| 5,838,828 A | 11/1998 | Mizuki et al. | |
| 5,845,062 A | 12/1998 | Branton, Jr. et al. | |
| 5,857,074 A | 1/1999 | Johnson | |
| 5,864,827 A | 1/1999 | Wilson | |
| 5,870,717 A | 2/1999 | Wiecha | |
| 5,872,637 A | 2/1999 | Nakanishi | |
| 5,881,168 A | 3/1999 | Takaoka et al. | |
| 5,884,280 A | 3/1999 | Yoshioka et al. | |
| 5,890,175 A | 3/1999 | Wong et al. | |
| 5,897,622 A | 4/1999 | Blinn et al. | |
| 5,918,009 A | 6/1999 | Gehani et al. | |
| 5,923,846 A | 7/1999 | Gage et al. | |
| 5,944,769 A | 8/1999 | Musk et al. | |
| 5,948,061 A | 9/1999 | Merriman et al. | |
| 5,949,875 A | 9/1999 | Walker et al. | |
| 5,960,409 A | 9/1999 | Wexler | |
| 5,968,120 A | 10/1999 | Guedalia | |
| 5,974,451 A | 10/1999 | Simmons | |
| 5,982,891 A | 11/1999 | Ginter et al. | |
| 5,982,941 A | 11/1999 | Loveridge et al. | |
| 5,983,200 A | 11/1999 | Slotznick | |
| 5,990,860 A | 11/1999 | Takeuchi | |
| 5,991,740 A | 11/1999 | Messer | |
| 6,006,197 A | 12/1999 | d'Eon et al. | |
| 6,006,231 A | 12/1999 | Popa | |
| 6,011,537 A | 1/2000 | Slotznick | |
| 6,014,701 A | 1/2000 | Chaddha | |
| 6,018,761 A | 1/2000 | Uomini | |
| 6,021,433 A | 2/2000 | Payne et al. | |
| 6,023,521 A | 2/2000 | Sarpeshkar et al. | |
| 6,023,701 A | 2/2000 | Malik et al. | |
| 6,026,371 A | 2/2000 | Beck et al. | |
| 6,037,937 A * | 3/2000 | Beaton et al. | 345/764 |
| 6,041,316 A | 3/2000 | Allen | |
| 6,054,999 A | 4/2000 | Strandberg | |
| 6,058,428 A | 5/2000 | Wang et al. | |
| 6,067,095 A | 5/2000 | Danieli | |
| 6,076,077 A | 6/2000 | Saito | |
| 6,097,389 A * | 8/2000 | Morris et al. | 345/804 |
| 6,109,923 A | 8/2000 | Rothenberg | |
| 6,118,459 A | 9/2000 | Hunter | |
| 6,141,666 A | 10/2000 | Tobin | |
| 6,211,878 B1 * | 4/2001 | Cheng et al. | 345/854 |
| 6,216,112 B1 | 4/2001 | Fuller et al. | |
| 6,230,194 B1 | 5/2001 | Frailong et al. | |
| 6,272,532 B1 | 8/2001 | Feinleib | |
| 6,301,555 B1 | 10/2001 | Hinderks | |
| 6,321,202 B1 | 11/2001 | Raveis | |
| 6,336,052 B1 * | 1/2002 | Ouellet et al. | 345/649 |
| 6,341,279 B1 | 1/2002 | Nye | |
| 6,358,054 B1 | 3/2002 | Rothenberg | |
| 6,363,411 B1 | 3/2002 | Dugan et al. | |
| 6,369,837 B1 * | 4/2002 | Schirmer | 345/764 |
| 6,388,686 B1 * | 5/2002 | Hetherington et al. | 715/810 |
| 6,405,178 B1 | 6/2002 | Manchala et al. | |
| 6,411,999 B1 | 6/2002 | Tinkler | |
| 6,463,462 B1 | 10/2002 | Smith et al. | |
| 6,463,468 B1 | 10/2002 | Buch et al. | |
| 6,473,803 B1 | 10/2002 | Stern et al. | |
| 6,493,685 B1 | 12/2002 | Ensel et al. | |
| 6,496,744 B1 | 12/2002 | Cook | |
| 6,496,851 B1 | 12/2002 | Morris et al. | |
| 6,519,632 B1 | 2/2003 | Brackett et al. | |
| 6,590,586 B1 * | 7/2003 | Swenton-Wall | 345/730 |
| 6,609,106 B1 | 8/2003 | Robertson | |
| 6,625,624 B1 | 9/2003 | Chen et al. | |
| 6,625,651 B1 | 9/2003 | Swartz et al. | |
| 6,701,343 B1 | 3/2004 | Kenyon | |
| 6,701,441 B1 | 3/2004 | Balasubramaniam et al. | |
| 6,711,594 B1 | 3/2004 | Yano et al. | |
| 6,734,883 B1 * | 5/2004 | Wynn et al. | 715/830 |
| 6,816,904 B1 | 11/2004 | Ludwig et al. | |
| 2001/0034646 A1 | 10/2001 | Hoyt et al. | |
| 2001/0037205 A1 | 11/2001 | Joao | |
| 2002/0049624 A1 | 4/2002 | Raveis | |
| 2002/0052785 A1 | 5/2002 | Tenenbaum | |
| 2002/0059364 A1 | 5/2002 | Coulthard et al. | |
| 2002/0091576 A1 | 7/2002 | Giordano et al. | |
| 2002/0118182 A1 | 8/2002 | Weindorf | |
| 2002/0133412 A1 | 9/2002 | Olvier | |
| 2002/0178450 A1 | 11/2002 | Morita et al. | |
| 2003/0034979 A1 | 2/2003 | Nakamura et al. | |
| 2003/0097361 A1 | 5/2003 | Huang | |

OTHER PUBLICATIONS

Accessability Options ("Assistive Computer Technology for Windows 98™ Training Manual", High Tech Center Training Unit of the California Community Colleges at the Foothill-De Anza Community Columnlege District, Cupertino, CA Jul. 2000).

Iap, et al., "ASIA MDL:A Prototype Electronic Content Service", IEEE DARE, 1998.

Chandra, et al., "JPEG Compression Metric As A Quality Aware Image Transcoding", 2nd USENIX Symposium On Internet Technologies & Systems, 1999, pp. 81-92.

Michael Macedonia, "Distributed File Sharing: Barbarians At The Gates?", IEEE Computer Magazine, Aug. 2000, vol. 33, Issue 8, pp. 99-101.

* cited by examiner

IMAGE DATABASE JOG/SHUTTLE SEARCH

RELATED APPLICATIONS

This application claims the benefit of U.S. Provisional Application No. 60/181,843, filed Feb. 11, 2000.

FIELD OF THE INVENTION

This invention relates generally to computers, and more particularly to allow viewers to search through images that are controlled by a dial.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Sony Electronics, Inc., All Rights Reserved.

BACKGROUND OF THE INVENTION

Presentation software exists that allows a computer to individually display a series of "slides" which are linked in a linear order. The slides may be a combination of text, pictures, and video. Advancing from one slide to the next, in either forward or backward direction is accomplished through the use of a mouse clicking on an arrow feature on the monitor. In this manner, viewing a number of slides is slow and requires a time consuming use of the mouse to accomplish. In addition, photograph manager software for computers provide illustration of individual pictures or may provide a number of pictures simultaneously in a single display, again through the use of the mouse click and select feature. When large numbers of images are to be viewed, these approaches are inadequate in that the viewing rate from image to image is slow and manipulation of the viewing features is not intuitive.

SUMMARY OF THE INVENTION

The ability to store files in electronic format makes it desirable to visually scan a large number of files quickly and easily. The present invention couples a dial to software for the purpose of displaying a plurality of files, often a group of photographs, in a linear order.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1:
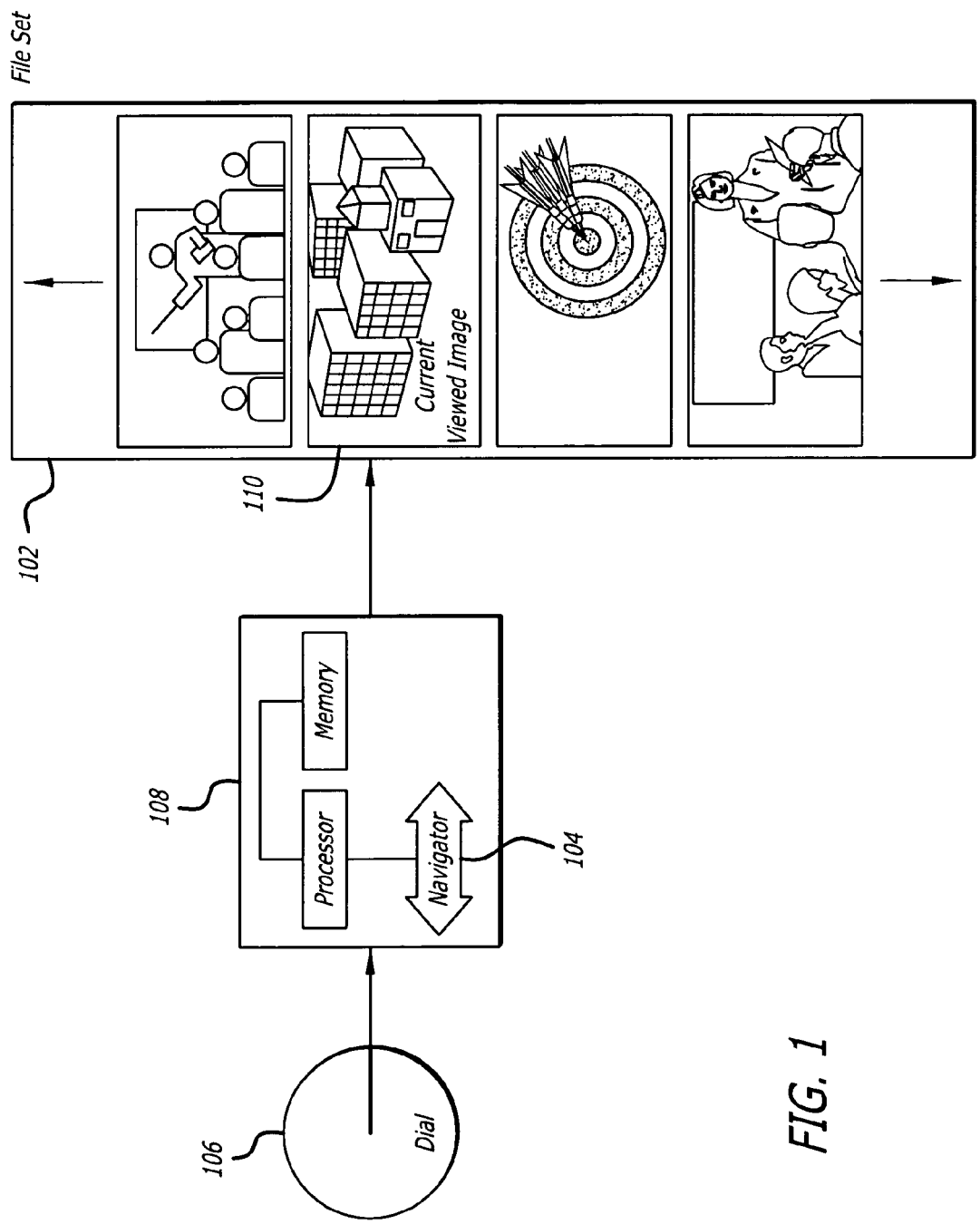
FIG. 1 is an illustration an implementation of a dial and software with file sets.

As illustrated in FIG. 1, the invention couples a dial with computer software to sequentially display files that are sequentially linked (file set) 102. In one embodiment, the files displayed may be images and may be displayed in thumbnail version, where the images can be viewed individually and sequentially at variable speeds. The speed for sequencing through the linked images may be set high enough to perceive the images displayed as a blur, slower to perceive the images as a video, or sequencing may be still on one image. The file set 102 may be viewed in both forward and backward directions. Control or navigation of the file set 102 is accomplished through the use of software 104 and a physical dial 106 or a visual dial equivalent such as a graphical user interface (GUI).

The dial 106 has several advantages over the use of conventional computer input devices such as a mouse or keyboard. The first is that the dial's 106 use is intuitively obvious to a viewer because of the viewer's prior experience with dials that operate other devices. Secondly, the dial 106, interfaced to a computer 108, may allow a series of files 102 to be easily displayed, in a manner ideally suited to the viewer's present need.

For instance, turning the dial 106 to the right or left will sequence the file set 102 display forward or backward. Next, the speed for searching through the file set 102 can be as desired, in that turning the dial 106 further in a direction from a dial stop position, can sequence the file set faster or slower. Such "fine tuning" of the dial's 106 radial movement allows the viewer to quickly "hone in" on particular files 110 for selection and viewing. In addition, the dial 106 may be "pushed-in" to perform a function such as the selection of a particular file or the release of a selected file. Once selected, the file(s) may then be flagged for easy return, for changing the order of display of individual files within the file set, for removal of files from the file, etc.

In order to import files, software implementation 104 of the dial 106 allows the dial 106 to adapt to any file storage method, such as a folder or directory in a file system, an image database, or a particular storage medium such as disc or memory modules.

Arrangement may be accomplished of the file set list 102 into an "album" to include any number of files. The file set 102 may be collected for a variety of purposes such as for use in a formal presentation, a set of home images available on the housing market, or to display personal photographs taken on a family vacation. The finished file set 102 may be used for either public access or for private access by an originator.

Multiple types of content can be placed into the file set; including text, graphics, still images, video, audio and/or a mix of multimedia data types. Thus, the file set may take on different forms, such as a movie with audio and video content, an audio-only display, a text-only display, or a text with still image illustrations.

Figure 2:
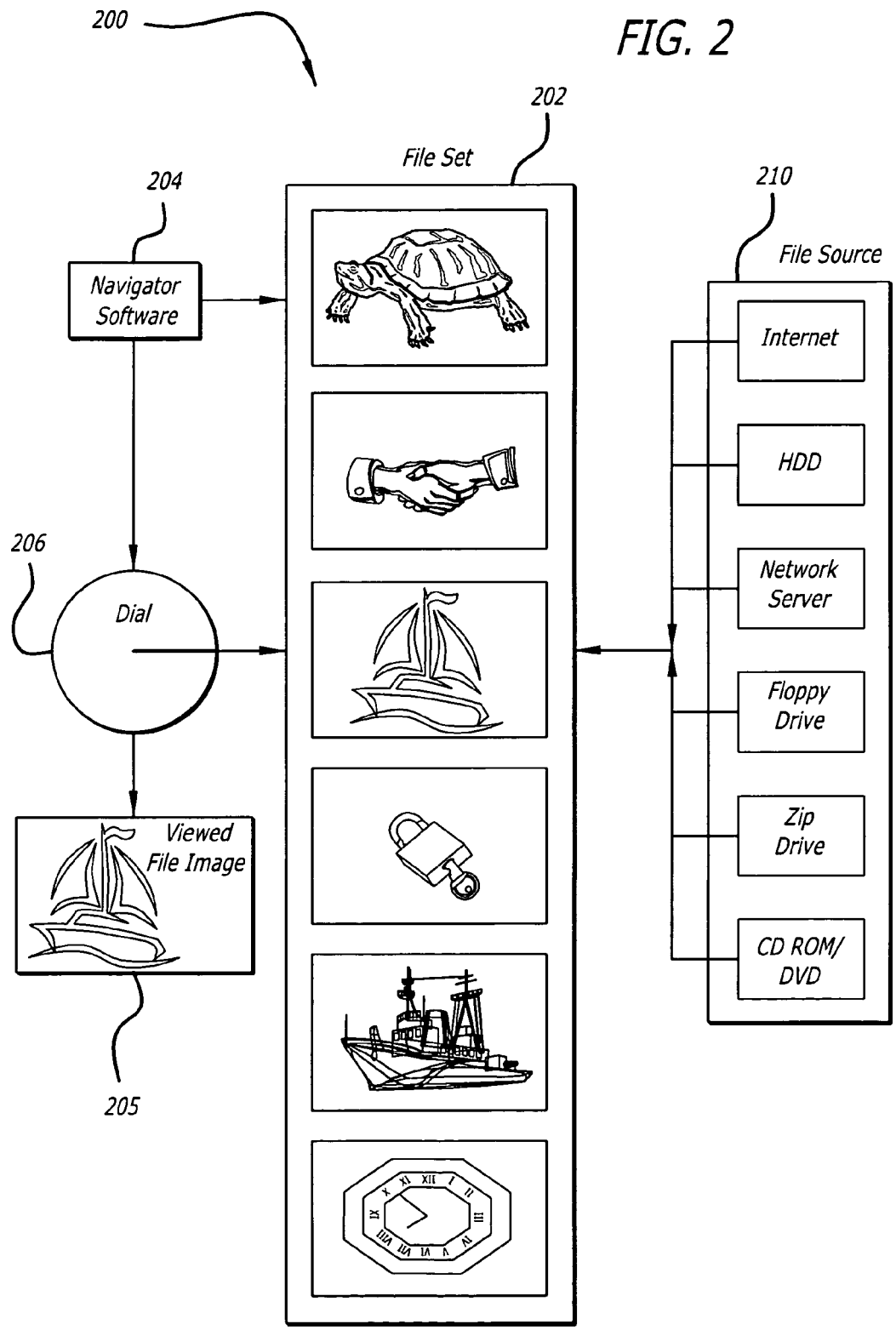
FIG. 2 is an illustration of an overview of obtaining files from a variety of sources for display.

Beginning with an overview of the operation of the invention, FIG. 2 illustrates one embodiment of a file viewing or navigation system 200. Using file navigation software (Navigator) 204 interactive with the movements of a dial 206, individual files 205 of a file set (of linearly linked files) 202 are displayed in a sequential order. Using Navigator software 204 and the dial 206, a file set 202 may be created from one or more locations 210 such as the Internet, a file on a hard disk, a local network server, a CD ROM, a DVD, or a floppy or zip drive. After creation of the file set 202, the individual files may be moved to a common location or left at the original locations. Once selected, the images may be linked together into the file set 202 where the file set 202 is accessed and viewed in a linear order. The images 202 may be placed in an order determined by a variety of methods such as by originator/viewer choice, the order of selection, by file format, or by location of the file. The still images 202 may be of differing formats such as jpeg, gif, or bitmap. The files 202 displayed may include a variety of other types of content such as text, graphics, video, audio and/or a mix of multimedia data types.

Figure 3:
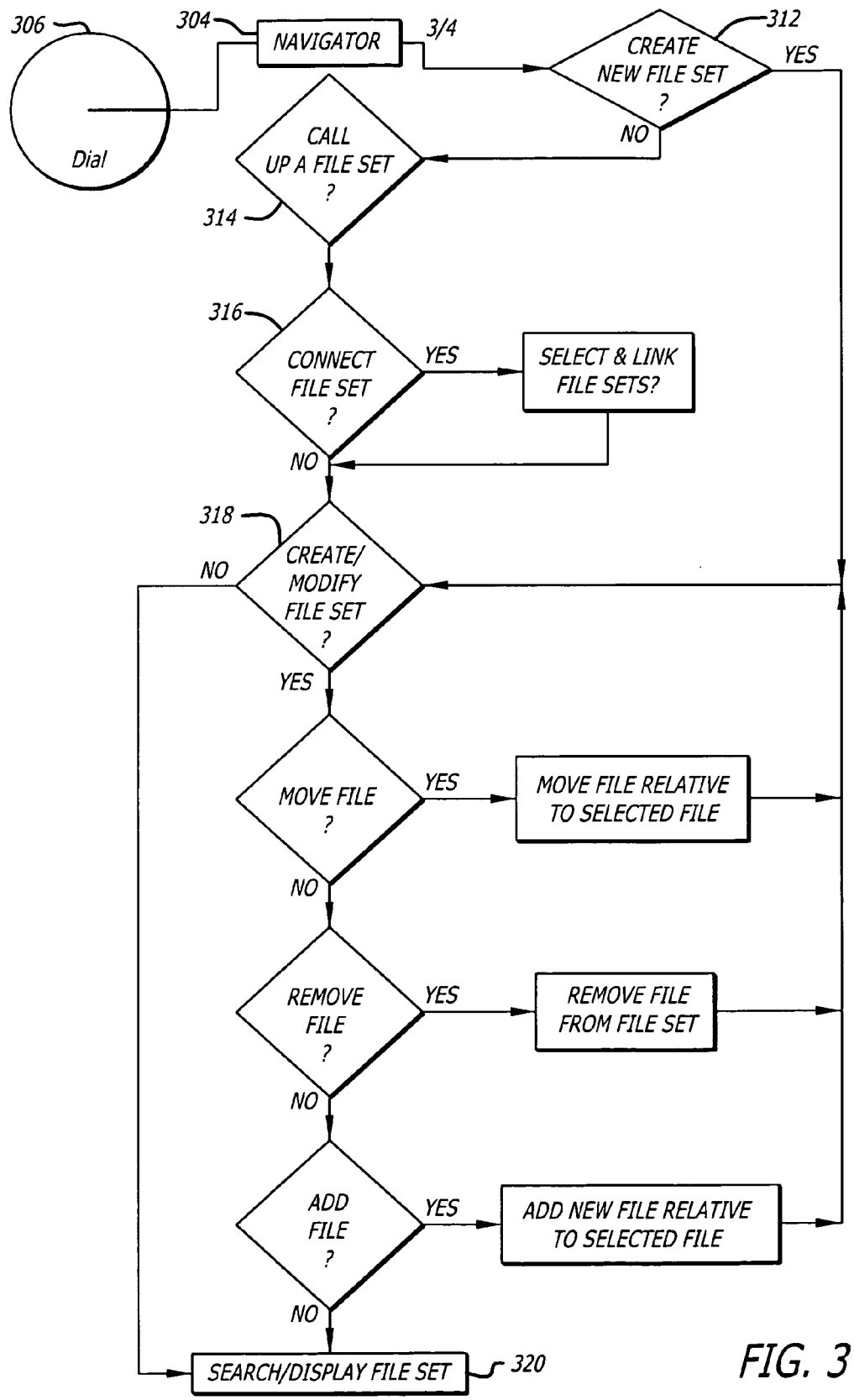
FIG. 3 is a flow diagram of software suitable for practicing the invention.

In one embodiment, as shown in FIG. 3, from within the Navigator software 304, the viewer may decide to create a new file set 312 or call-up an existing file set 314. Existing file sets can be linked 316, individual files sets can be modified 318, and finally a search/view 320 the file set may be accomplished.

Once a file set is selected with the Navigator 304, the Navigator 304 connects the dial controls 306 with the file set and provides an initial display 320. The Navigator may select any file location in the file set to initially display. Such an initial file display could be of an image located at the beginning or in the middle of the list. The Navigator dial 306 may turn 360° with no stops and, as such, may be pre-set to the null or stopped position on the initially displayed image. It is to be appreciated that not all blocks within the FIG. 3 flow diagram are needed and that the order of blocks are not important to practice the disclosed invention.

The dial may be a physical device located internal (built-in) to the computer or external to the computer (such as connected to the computer through a serial/parallel bus) and can be operated manually. However, it is possible to have the dial presented on a computer monitor as a visual or GUI dial that can be operated in a manner similar to the physical dial. The visual dial may be manipulated by voice command or by rotating/pushing the visual dial with a mouse, a keyboard, a touch sensitive pad, or a touch sensitive monitor. The visual dial may not appear as a dial but could by any visual representation that accomplishes the same easy use as the visual dial. Such alternate shapes could include plus/minus buttons or a "sliding" button on a bar.

In one embodiment, turning the dial to the right of the stopped position causes files to be displayed one after another in a linear fashion. In this manner, each file is fully displayed in the order linked before progressing to the next image in the file set. The display of files progresses in a direction along the file set, such as turning the dial to the right past stop could progress the display of files in one direction (forward) while turning the dial to the left of stop could progress the display of files in an opposite (backward) direction. In addition, the further the dial is turned from the stop point, the faster the files are sequentially displayed. At some point, the speed of displaying files one after another would be such that some files might be skipped from display. Based on an algorithm in the Navigator software, depending on the speed of sequencing, displayed files might be every other image, every fifth image, every nth . . . to be sufficient to provide the desired displaying appearance during high speed traversing of the file set.

Once a desired file has been located (the dial at stop and the file displayed), the dial may be pushed in to select the file. The affect of the selection may be to flag the file for easy return to that file in the future, to remove the file from the file set, or to collect (remove or copy) a series of files from the file set to place into a new file set.

The Navigator software can be located at the viewer's computer, however it is also possible to locate the Navigator software at a server on a network or over the Internet to function for viewers remotely. In this case, the host Navigator could activate the physical dial on the viewer's computer or provide an interactive visual dial on the viewer's monitor. In this manner, a series of files can be rapidly searched and displayed through the web or network for an endless number of purposes. A remote viewer may: log onto a friend's web site and view a new set of family pictures; log onto a web site of a realty company to see available homes on the housing market; a photography business to view a portfolio; for employee access to company archived images; police suspect image lists; missing people image lists; maps; etc.

In the case where two-dimensional travel/viewing is desired, such as when viewing the map, the Navigator could link a number of file sets together to allow a viewer to view the map. The dial could travel "up" and "down" map images of an individual file set where the terrain of a second image begins where a previous terrain image left off. In addition, pushing in the dial could allow the viewer, when rotating the dial, to jump sequentially to images in other file sets in a manner that would let the viewer travel "right" and "left" on the map. The resulting effect would be to provide the viewer with a method to easily travel/view across an entire map made from these specially cross-linked file sets.

It is possible to have a remote computer for a remote user execute a conventional Internet browsing application or a network application to exchange data with the Navigator residing on a server. Therefore, it is readily apparent that the present invention is not limited to private use by a single viewer. In an embodiment, an administrator of a web site or network may set rating criteria for the images available over the web or network to prevent the posting of information which may be offensive or limited to some viewers. In the case where the invention is practiced over the Internet, it is possible to allow an originator of a file set to market files through such Internet access as well as to have the originator provide marketing banners within a web site.

Figure 4A:
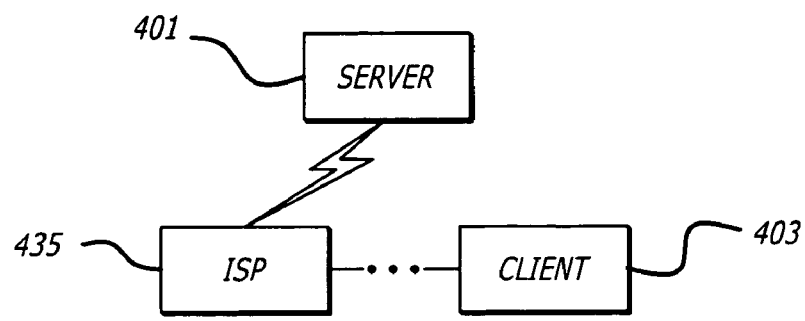
FIG. 4*a* is a flow diagram of a client interacting with a server.
Figure 4B:
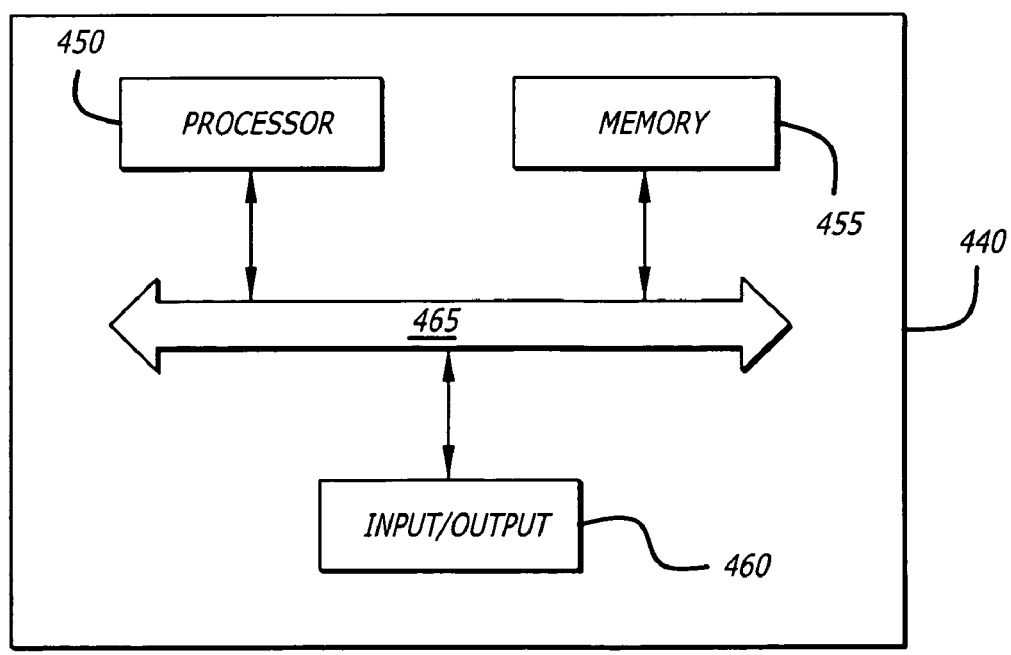
FIG. 4*b* is a flow diagram of processing elements of a typical computer.

One embodiment of a computer system suitable for use as the host server is illustrated in FIGS. 4a & b. Additionally, FIG. 4b is suitable as one embodiment of a computer system of a standalone computer. The computer system 441, includes a processor 450, memory 455 and input/output capability 460 coupled to a system bus 465. The memory 455 is configured to store instructions which, when executed by the processor 450, perform the methods described herein. The memory 455 may also store data and content related to the stories. Input/output 460 provides for the delivery and display of the content of the story or portions or representations thereof. Input/output 460 also encompasses various types of computer-readable media, including any type of storage device that is accessible by the processor 450. One of skill in the art will immediately recognize that the term "computer-readable medium/media" further encompasses a carrier wave that encodes a data signal. It will also be appreciated that the server 401 is controlled by operating system software executing in memory 455. Input/output and related media 460 store the computer-executable instructions for the operating system and methods of the present invention as well as the data and content related to the images.

The description of FIGS. 4a & b is intended to provide an overview of computer hardware and other operating components suitable for implementing the invention, but is not intended to limit the applicable environments. It will be appreciated that the computer system 440 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

The use of the disclosed invention for providing rapid access to a list of files is endless. One example has a potential buyer accessed via the Internet to an all night auction site such as eBay™. The potential buyer can view one of many linked sets of images available. The list may be created through a set of instructions driven by the potential buyer's requests. The potential buyer may request to see all 1950's Chevrolet's for sale. Based on this request, a list is assembled, the potential buyer's physical dial is enabled or a dial appears on the potential buyer's screen, and the buyer has access to the list of images of available 1950's Chevy's. The potential buyer can then quickly scroll through the list of vehicle images to quickly decide if any are of interest. Vehicles that are of interest can be selected and the selection process can activate further information screens having more detail. In this manner, an evaluation of available automobiles, that are of interest to the potential buyer, can be quickly and efficiently determined.

A set of linearly linked files (file set) that are connected by software to a dial for easy search and viewing has been described. The size of the set of files can vary with the need and type of review and a search of the file set can be accomplished at a variable rate with the turn of a dial. The files displayed can be private or made available on the Internet to the public or on a smaller scale such as a local network. Through the use of the dial, the files can be viewed sequentially backward or forward and at whatever speed supported by the computer throughput. Using the push-in (or pull-out) feature of the dial, file sets may be cross-linked for 2D viewing such as with a map, individual files may be selected to be moved around in sequence, new files added, old files removed, or files of interest flagged to locate and return to easily in the future.

In one embodiment, the dial allows for a quick and easy search of a large number of files. However, the dial may set to sequence a series of images that tell a story or may take the form of a movie, or it may be a text story with still image illustrations.

Next, the particular aspects of the invention are described in terms of computer software with reference to a series of illustrations and a flow diagram. FIG. 3 provides a software flow diagram that executes the process of file selection and display that is illustrated in FIG. 2. The methods constitute computer programs made up of computer-executable instructions. Describing the methods by reference to a flow diagram enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. Finally, it should be appreciated that all instructions depicted in the FIG. 3 flow diagram need not be performed by software resident at a user's computer. The various components of the FIG. 3 flow diagram may be performed over the Internet or over a network by a host server.

A way to search a potentially large number of files has been described that allows one or more viewers to rapidly search those files and to select any of those files that are of interest. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while invention as been described in terms of creating a list of picture images, it encompasses all types of story media, including pure text, illustrated text, the combination of audio and video, and audio only.

The terminology used in this application with respect to networks is meant to include all of environments in which a server computer communicates with client computers to send and receive data. Therefore, it is manifestly intended that this invention be limited only by the following claims and equivalents thereof.

What is claimed is:

1. A computerized system comprising:
   a processor;
   a memory coupled to the processor;
   a computer-readable medium coupled to the processor;
   a file displaying process executed from the computer-readable medium by the processor to cause the processor to receive content and construct from the content a set of sequentially linked files; and
   a dial interactive with the set of sequentially linked files, the dial is capable of being physically rotated to sequentially display the set of sequentially linked files and depressed to select a linked file currently being displayed and to flag a file location of the linked file for subsequent return to the linked file.

2. The computerized system of claim 1 further comprising an input/output device operating as a display.

3. The computerized system of claim 1, wherein the set of sequentially linked files are modified by manipulating the dial.

4. The computerized system of claim 1, wherein the dial being rotated in a clockwise direction away from a dial stop position to display the set of sequentially linked files in a forward direction and rotated in a counter clockwise direction away from the dial stop position to display the set of sequentially linked files in a backward direction.

5. A networked server system comprising:
    means for posting a linked set of files for display; and
    means for sequentially displaying the content of the linked set of files via a physical dial that controls a sequential display of the set of files based on rotation of the dial with a speed of the sequential display being based on a rotational position of the dial from a dial stop position.

6. The networked server system of claim 5, further comprising:
    means for modifying the linked set of files.

7. The networked server system of claim 5, further comprising:
    means for restricting access to the linked set of files.

8. The networked server system of claim 5, further comprising:
    means for viewing individual files sequentially across the content of more than one linked set of files.

9. A computerized apparatus, comprising:
    a dial adapted for rotations to sequentially display a set of files, the dial adapted to be moved in a direction along an axis of rotation for selection of a file of the set of files currently being displayed; and
    software interactive with the dial to control the display the files based on movement of the dial.

10. The apparatus of claim 9, wherein the dial to select and flag the file for easy return to the file when the dial is moved in the direction along the axis of rotation.

11. The apparatus of claim 10, wherein the dial is rotated in a right direction to progress the display of the set of files in a forward direction.

12. The apparatus of claim 9, wherein the dial is pushed in and moved in the direction along the axis of rotation in order to remove the file from the set of files.

13. A method for presenting presentations, the method comprising:
    receiving an input via an interface representing a visual dial;
    determining a direction of rotation of the visual dial that causes a set of presentations to be sequentially displayed (i) in a forward linear order when the visual dial is rotated in a first direction from a stop dial position and (ii) in a reverse linear order when the visual dial is rotated in a second direction from the stop dial position; and
    sequentially displaying at least one presentation from the set of presentations in response to the input.

14. The method of claim 13 further comprising:
    detecting a first operation of pushing-in the virtual dial; and
    selecting a presentation of the set of presentations being displayed in response to the first operation of pushing-in the virtual dial.

15. The method of claim 14, further comprising performing a drag and drop operation to rotate visual dial.

16. The method of claim 14, wherein the selecting of the presentation includes copying the presentation into a new set of presentations.

17. The method of claim 16, wherein the selecting of the presentation includes removing the presentation from the set of presentations.

18. The method of claim 16, wherein the selecting of the presentation includes setting a flag associated with the presentation for retrieval of the presentation.

19. The method of claim 14, further comprising:
    determining a speed of the sequential display of the set of presentations based on a radial position of the dial from the stop dial position; and
    sequentially displaying the at least one presentation in a presentation rate associated with the radial position of the dial.

20. The method of claim 13, wherein the at least one presentation comprises at least file.

21. The method of claim 13, wherein the at least one presentation comprises at least one image.

22. The method of claim 13, further comprising:
    receiving a signal representing a stop of the rotation of the virtual dial, the signal indicating the stop dial position of the virtual dial;
    identifying a presentation from the set of presentations in response to the signal; and
    displaying the identified presentation as a still image.

23. The method of claim 22, wherein the still image is displayed larger than the sequentially displayed set of presentations.

24. The method of claim 22, further comprising:
    detecting a first operation of pushing-in the virtual dial; and
    selecting the presentation corresponding to the still image in response to the first operation of pushing-in.

25. The method of claim 24, further comprising:
    detecting a second operation of pushing-in the virtual dial; and
    unselecting the presentation corresponding to the still image in response to the second operation of pushing-in.

26. The method of claim 13, wherein the input is received from a remote client over a network and the presentation is displayed at the remote client over the network.

27. The method of claim 13, wherein the input is received through the use of voice activated commands.

28. The method of claim 13, wherein prior to sequentially displaying the at least one presentation, the method further comprising:
    determining a speed of the sequential display of the set of presentations based on a radial position of the dial from the stop dial position.

29. A machine-readable medium having executable instructions to a cause a device to perform a method comprising:
    receiving an input via an interface representing a virtual dial capable of being visually rotated to sequentially display a set of presentations rotated in a forward linear order when the visual dial is rotated in a first direction from a stop dial position and rotated in a reverse linear order when the visual dial is rotated in a second direction from the stop dial position; and
    sequentially displaying at least one presentation from the set of presentations in response to the input.

30. The machine-readable medium of claim 29, wherein the method further comprises performing a drag and drop operation to visually rotate the visual dial.

31. The machine-readable medium of claim 29, wherein the at least one presentation comprises at least file.

32. The machine-readable medium of claim 29, wherein the at least one presentation comprises at least one image.

33. The machine-readable medium of claim 29, wherein the first direction is a clockwise direction to cause sequential display of the at least one presentation in an advanced direction.

34. The machine-readable medium of claim 29, wherein the second direction is a counter clockwise direction to cause sequential display of the at least one presentation in a reversed direction.

35. The machine-readable medium of claim 29, wherein the method further comprises:
   determining a dialing sped of the rotation of the dial; and
   sequentially displaying the at least one presentation in a presentation rate associated with the dialing speed.

36. The machine-readable medium of claim 29, wherein the method further comprises:
   receiving a signal representing a stop of the dialing, the signal indicating the dial stop position of the virtual dial;
   identifying a presentation from the set of presentations in response to the signal; and
   displaying the identified presentation as a still image.

37. The machine-readable medium of claim 36, wherein the still image is displayed larger than the sequentially displayed presentations.

38. The machine-readable medium of claim 36, wherein the method further comprises:
   detecting a first operation of pushing-in the virtual dial; and
   selecting the presentation corresponding to the still image in response to the first operation of pushing-in.

39. The machine-readable medium of claim 38, wherein the method further comprises:
   detecting a second operation of pushing-in the dial; and
   unselecting the presentation corresponding to the still image in response to the second operation of pushing-in.

40. The machine-readable medium of claim 38, wherein the method further comprises removing the selected presentation from the preselected set of presentations.

41. The machine-readable medium of claim 29, wherein the input is received from a remote client over a network and the at least one presentation is displayed at the remote client over the network.

42. The machine-readable medium of claim 29, wherein the input is received through the use of voice activated commands.

43. An apparatus comprising:
   means for receiving an input via an interface representing a user manipulable dial capable of being visually dialed through rotations to sequentially display a set of presentations; and
   means for sequentially displaying at least one presentation from a preselected set of presentations in response to the input, the set of presentations being rotated in a forward linear order when the dial is rotated in a first direction from a stop dial position and rotated in a reverse linear order when the dial is rotated in a second direction from the stop dial position.

44. A system comprising:
   a memory;
   a processor coupled to the memory; and
   a process executed by the processor from the memory to cause the processor to:
   receive an input via an interface representing a dial capable of being visually rotated to sequentially display a set of presentations;
   determining a direction of rotation of the dial that causes the set of presentations to be sequentially displayed (i) in a forward linear order when the dial is rotated in a first direction from a stop dial position and (ii) in a reverse linear order when the dial is rotated in a second direction from the stop dial position; and
   sequentially display at least one presentation from a preselected set of presentations in response to the input.

* * * * *